United States Patent [19]

Gibbons et al.

[11] Patent Number: 4,877,317

[45] Date of Patent: Oct. 31, 1989

[54] DUAL FIELD OF VIEW CATADIOPTRIC OPTICAL SYSTEM

[75] Inventors: Robert C. Gibbons, Richardson; Wilbur W. Cottle, Plano, both of Tex.

[73] Assignee: Texas Instruments Incorporated, Dallas, Tex.

[21] Appl. No.: 2,061

[22] Filed: Feb. 27, 1987

Related U.S. Application Data

[62] Division of Ser. No. 538,397, Oct. 3, 1983, abandoned.

[51] Int. Cl.$^4$ .................... G02B 15/02; G02B 23/04
[52] U.S. Cl. ........................................ 350/559
[58] Field of Search ........................................ 350/559

[56] References Cited

U.S. PATENT DOCUMENTS 4,283,113 8/1981 Eden .................................. 350/353

FOREIGN PATENT DOCUMENTS 0051970 5/1982 European Pat. Off. .

Primary Examiner—Bruce Y. Arnold
Attorney, Agent, or Firm—Rene' E. Grossman; Melvin Sharp

[57] ABSTRACT

A dual field of view catadioptric optical system is disclosed which includes a narrow field of view (FOV) and a wide FOV. The narrow field of view includes an apertured stationary primary reflector and a secondary reflector which may be pivoted into a common optical path for blocking radiant energy for the wide field of view during operation in the narrow field of view and pivoted out of the common optical path for operation in the wide field of view. In another embodiment, the secondary reflector is replaced by a transparent/reflector which is always located in the common optical path. The element is transparent to radiant energy until heated at which time it becomes reflective. Thus, when transparent, the system operates in the wide field of view mode and when reflective, the system operates in the narrow field of view mode.

5 Claims, 5 Drawing Sheets

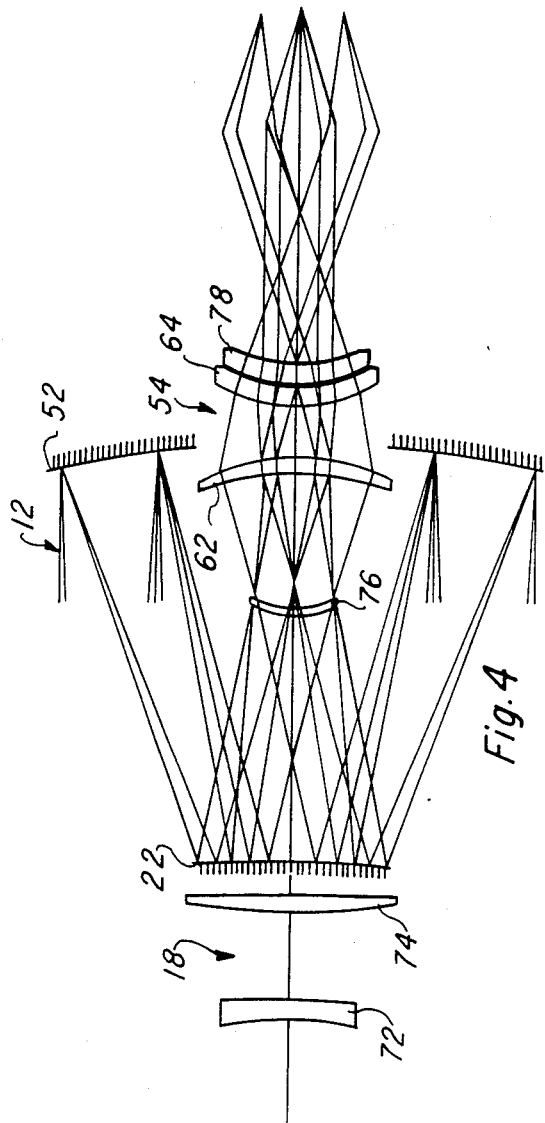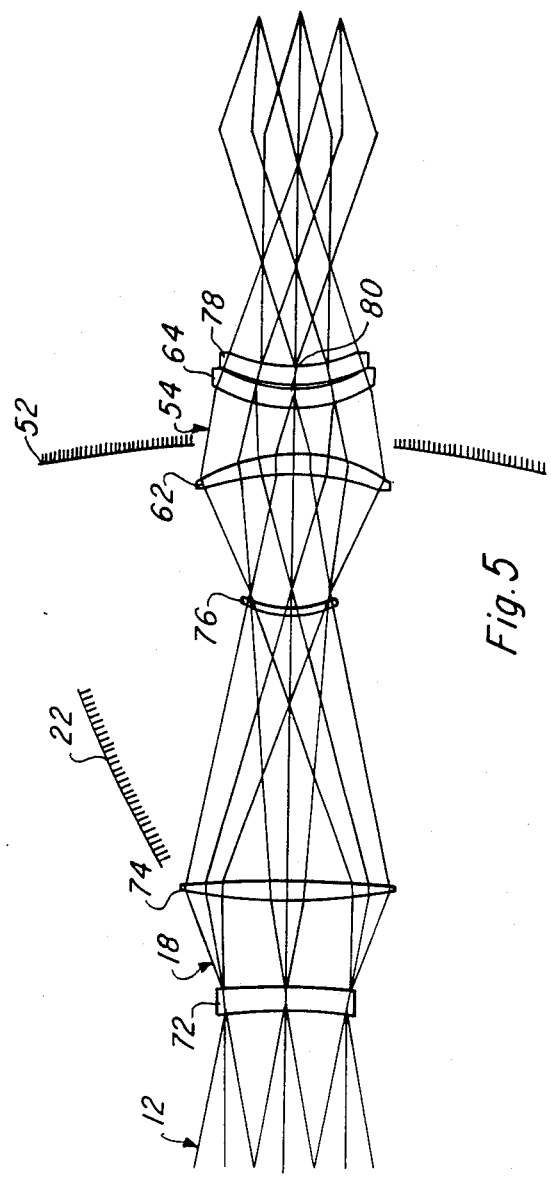

DUAL FIELD OF VIEW CATADIOPTRIC OPTICAL SYSTEM

This is a division of application Ser. No. 538,397 filed Oct. 3, 1983, now abandoned.

This invention relates to optical systems and more particularly to a dual field of view catadioptric optical system.

In the past dual field of view optical systems, such as that disclosed in U.S. Pat. No. 3,610,930, issued Oct. 5, 1971 to Dennis C. Lacy, have included a stationary lens which functions as a window for a housing for the system. The stationary lens is used with either a narrow field of view lens assembly or a wide field of view lens assembly. The two lens assemblies are rotatably connected in the housing so that either field of view can be selected or both fields of view removed from the optical path.

Also in the past it has been known to increase the field of view in an extensoscope by replacing an erector lens with a shorter focus lens (George S. Monk and W. H. McCorkle, Optical Instrumentation 169, 1954).

The disadvantages of these systems are, respectively, the cost and size of the pivotable off axis components and the manual substitution of lenses to obtain different fields of view.

Accordingly, it is an object of this invention to provide a low cost optical system which is compact in size and light in weight.

Another object of the invention is to provide a centered, uni-axial reflective optical system with a dual field of view having both a high resolution, narrow field of view and a low resolution, wide field of view.

Briefly stated, the invention comprises a shared objective dual field of view optical system utilizing a reflective objective for the narrow field of view with a refractive relay group to transfer the image plane to an accessible location behind the primary mirror.

These and other objects and features of the invention will become more readily understood in the following detailed description taken in conjunction with the drawings in which:

FIG. 1b is a front plan view of the dual field of view optial system of FIG. 1a;

FIG. 4 is a plan view of the narrow field of view of the reflective afocal optics for the dual field of view optical system;

FIG. 5 is a plan view of the wide field of view reflective afocal optics with the reflector pivoted out of the optical path of the dual field of view optical system.

Figure 1B:
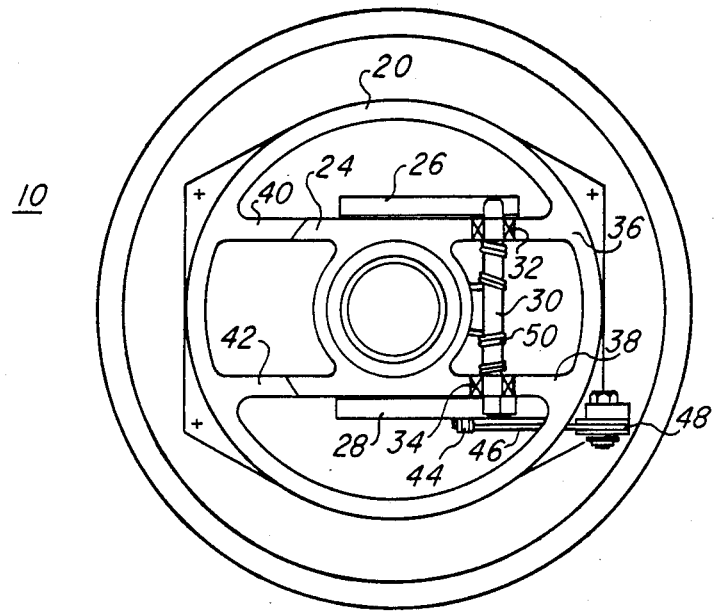
Figure 1A:
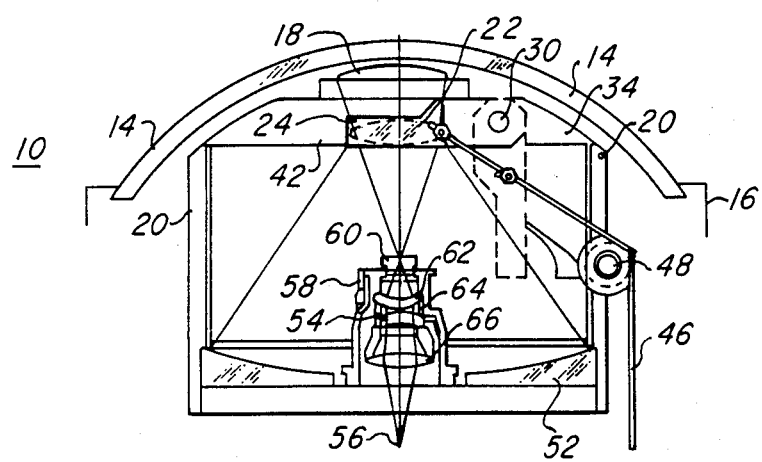
FIG. 1a is a top plan view of the dual field of view optical system including the reflector switching mechanism.
Figure 2:
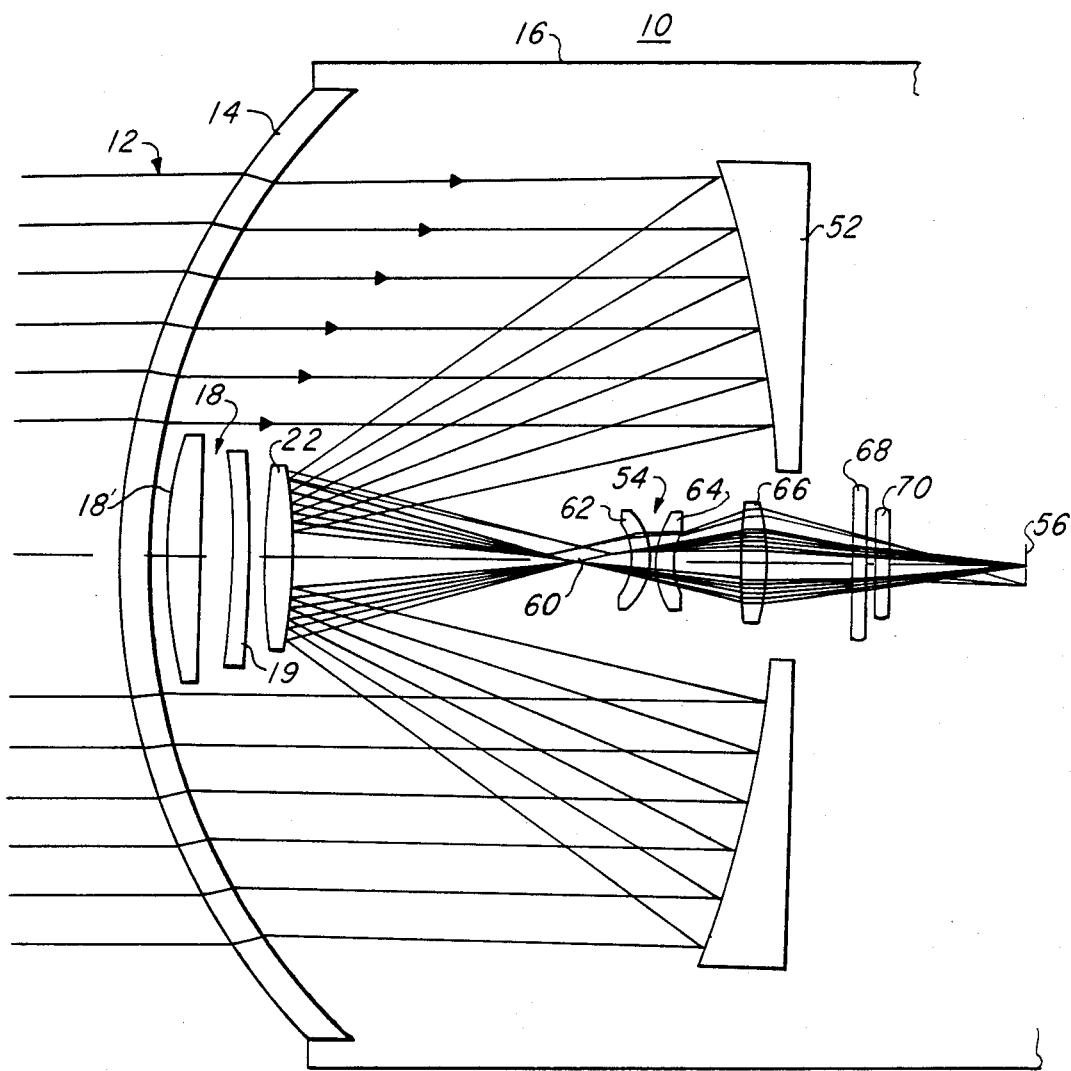
FIG. 2 is a side view of the narrow field of view optics of the dual field of view optical system in a housing.

Referring now to FIGS. 1a and 1b, the first embodiment of the dual field of view optical apparatus 10 has utility in radiant energy (including visible and infrared) systems. The incoming radiation 12 (FIGS. 2-5) passes through a window 14 (FIG. 1a) of dome 16 (FIG. 2). Dome 16 protects the internal optics and other equipment from the physical elements of the environment.

Window 14 is a refractive optical element which for an infrared system is made, for example, of zinc sulfide and has a spherical shape.

A wide field of view optic or lens doublet 18 which includes lenses 18' and 19 (FIGS. 2&3), is rigidly fixed to one end of an optical housing 20 centrally disposed on the optical axis adjacent to the window 14. A secondary reflector 22 which may be, for example, an aluminum mirror is rigidly mounted in a frame 24 (FIG. 1b). Frame 24 is attached to supporting plates 26 and 28. Plates 26 and 28 are fixed to a connecting pin 30 which is journaled in bearings 32 and 34 of ears 36 and 38 of the optics housing 20. Frame 24 has its side opposite the journaled end supported by corresponding flanges 40 and 42.

Plate 28 (FIGS. 1a and 1b) has an eye 44 to which a cable 46 is attached. Cable 46 passes through the optics housing 20 and a guide pulley 48 to an actuator (not shown). The guide pulley 48 is attached to the optics housing 20. The actuator pulls the cable 46 to pivot the secondary reflector out of the narrow field of view position to establish the wide field of view. A return spring 50 mounted on pin 30 and in engagement with the secondary reflector's mounting frame 24 acts to return the secondary reflector into the narrow field of view position when the tension is removed from cable 46. It wil be appreciated that the above-described mechanical secondary lens assembly actuator is only one example and those persons skilled in the art have knowledge of a large number of alternative lens switching mechanisms.

An apertured primary reflector 52 (FIG. 1a) which may be, for example, an aluminum mirror is attached to the optics housing 20. A relay optical system 54 is mounted in the apertured primary reflector 52 along the optical axis to form a second focal plane 56. The relay optical system comprises an eye piece 58 having one end 60 at a first focal plane, collimating lenses 62 and 64 within the housing and a focusing lens 66 at the end opposite the end 60 of the eye piece 58. Lens 62 is a concave-convex positive lens, lens 64 is a convex-concave negative lens and lens 66 is a convex-convex positive lens. Lenses 62, 64 and 66 are refractive and all surfaces are spherical. By way of example, lens 64 is a zinc sulphide lens; while lenses 62 and 66 are chalcogenide glass lenses such as TI1173 glass manufactured and sold by Texas Instruments Incorporated, Dallas, Tex.

Referring now to FIG. 2 for a description of the narrow field of view opearation. In FIG. 2, only the optical elements have been retained for clarity of the description and the return spring 50 (FIG. 1b) is maintaining the secondary reflector 22 in the optical path for narrow field of view operation. In the narrow field of view operation mode the incoming energy 12 is refracted as it passes through window 14 to the reflecting surface of the primary reflector 52.

The radiant energy is folded and reflected off the reflecting surface of the secondary reflector 22. In the preferred embodiment the secondary reflector 22 blocks the wide field of view optical path.

The refractive window 14, primary reflector 52 and secondary reflector 22 form a catadioptric objective optical system which folds and focuses the incoming radiant energy to form a first focal plane 60 which is symmetrical around the optical axis of the optical system 10. The primary reflector 22 defines the aperture stop of the optical system 10. The image of the aperture stop as viewed from the scene appearing at the window is defined as the entrance pupil.

The relay optical system 54 is optically positioned to extend the first field of view through a window 68 in a vacuum housing and exit pupil aperture 70 to a second field of view 56. A detector matrix (not shown) of, for example, an infrared system such as that disclosed in U.S. patent application Ser. No. 325,459 filed Nov. 27, 1981 for Compact, High Cold Shield Efficiency Optical System, may be positioned at the second field of view for producing an electrical representation of the intensity of the radiant energy impinging thereon. The relay optics of the relay optical system also serves the purpose of forming an exit pupil. The exit pupil is the refocused image of the aperture stop; therefore by placing an aperture 68 at this location, any extraneous energy from unwanted sources is substantially eliminated from reaching the detector matrix. To provide and maintain a compact optical system, the relay optical system is included between the primary and secondary reflectors.

Figure 3:
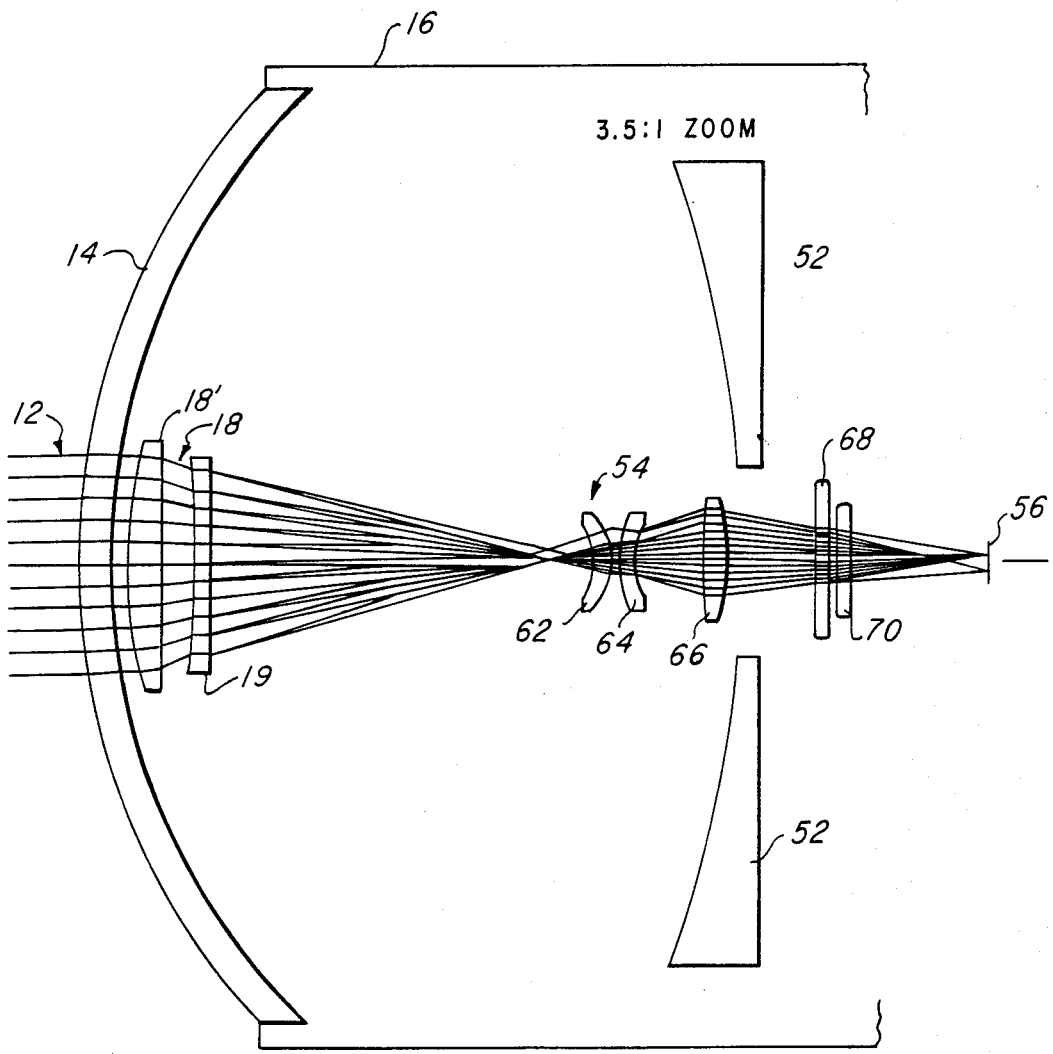
FIG. 3 is a side view of the wide field of view optics of the dual field of view optical system in a housing.

Referring now to FIG. 3 for a description of the wide field of view. Again the hardware has been removed for clarity and tension has been applied to the cable 46 (FIGS. 1a and 1b) to remove the secondary reflector 22 from the optical path. Thus radiant energy 12 from a scene passes through the window 14 along its optical axis through a refractive objective lens doublet 18 to the refractive relay group 54 which is shared with the narrow field of view.

Referring now to FIG. 4 for a description of a reflective afocal wide field of view for a dual field of view system in which the objective lens doublet 18 comprises a positive concave-convex lens 72 and negative concave lens 74. The secondary reflector 22 is removed from the optical path. A positive lens 76 is inserted just in front of the first focal plane and an eye piece 58. Positive lens 76, if used, need not be removed from the optical path for use of the narrow field-of-view. The eye piece includes a collimating lens system 54 which has a positive concave-convex lens 62, a negative concave-convex lens 64 and a second negative concave-convex lens 78.

The radiant energy 12 from the scene passes through the objective lens 18 to form by lenses 72 and 74, a much wider field of view than the objective lens 18 of the device of FIG. 3. The converging wide angle field of view passes through lens 76 which flattens the wide angle field of view and transfers the focal plane to the relay lenses 62 and 64 of eye piece 54 which relays the focal plane through lens 78 of the eye piece to a second focal plane position outside primary reflector 52 and secondary reflector 22. The objective lens 18 and eye piece 54 form the afocal system. The air space 80 between lenses 64 and 78 provides abberation control.

Referring now to FIG. 5 for a description of a reflective afocal narrow field of view for a dual field of view system. The structure is identical to that described in FIG. 4 except that the secondary reflector 22 is inserted in the optical path to block the wide angle field of view radiant energy. The radiant energy 12 from the scene of the narrow field of view is reflected by primary reflector 52 and secondary reflector 22 into the optical path.

Figure 6:
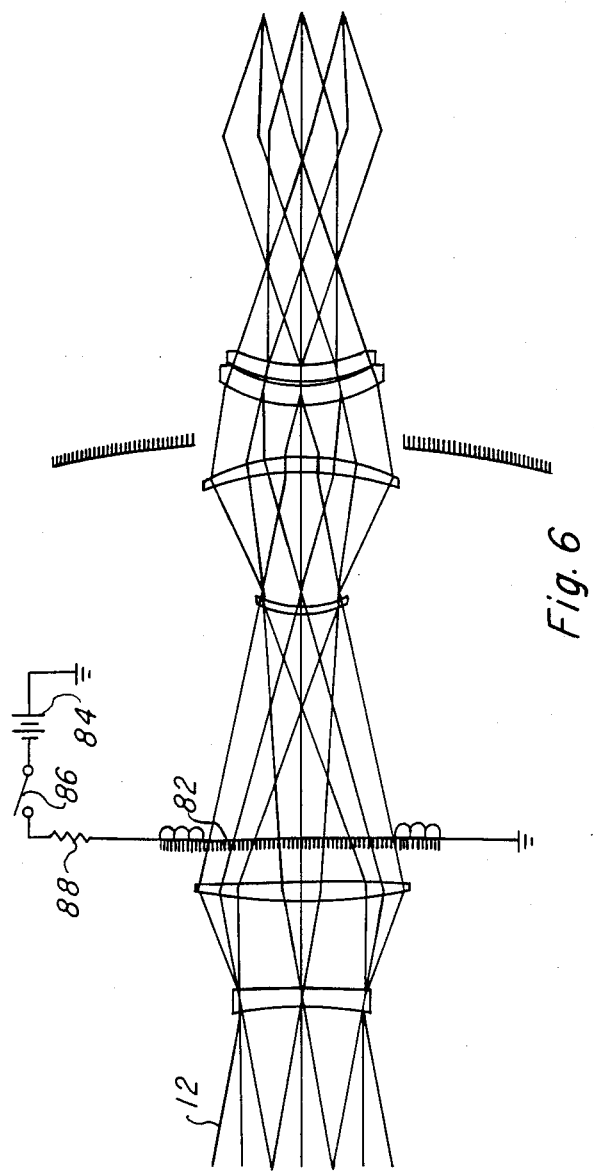
FIG. 6 is a side view of a second embodiment of the dual field of view optical system.

Referring now to FIG. 6 for a description of a second embodiment of the invention. In this embodiment, the secondary reflector 22 of FIG. 4 is replaced by a reflector/transparent optical element 82. The transparent/reflector element 22 is made of a material such as, for example, vanadium dioxide which when heated changes from a transparent body to a reflector body. Heat for the element may be provided by a simple circuit which includes a source of power 84 connected to one side of a suitable switch 86 having its other side connected through a load resistor 88 to a high resistance coil 82 thermally connected to the optical element 82. The remaining optical elements are those described in conjunction with FIG. 4. It is to be appreciated that radiant energy reflected by the primary reflector during operation in the wide field of view does not interfere with the wide field of view as the radiant energy is of very low intensity due to the transmissive nature of element 82 when in the wide field of view.

Although preferred embodiments of the present invention have been described in detail, it is to be understood that various changes, substitutions, and alterations can be made therein without departing from the scope of the invention as defined by the appended claims.

What is claimed is:

1. A dual field of view optical system including a narrow field of view optical subsystem, a wide field of view optical subsystem and a relay subsystem common to said narrow field of view and wide field of view optical subsystems, comprising:
   (a) said narrow field of view optical subsystem including a reflective objective system for forming a first focal plane, the reflective objective system including a primary reflector for reflecting radiant energy incoming thereto and a fixed optical element responsive to an external source of electrical power for reflecting radiant energy from said primary reflector towards the relay subsystem to form a first focal plane, said fixed optical element mounted in the optical path between said wide field of view subsystem and said optically refractive relay subsystem;
   (b) said wide field of view optical subsystem including a refractive objective lens system for forming a first focal plane and including said fixed optical element which transmits the wide field of view light to said relay subsystem when said fixed optical element provides radiant energy transmission in response to an absence of supplied electrical power;
   (c) said optically refractive relay subsystem common to the narrow field of view reflective objective system optical path and wide field of view refractive objective lens system optical path for forming an exit pupil, said exit pupil being a second focal plane at an accessible location, said optically refractive relay subsystem including an apertured means serving as a field stop for substantially eliminating the passage of any extraneous energy; and
   (d) control means in the optical path between the narrow field of view optical subsystem and the wide field of view optical subsystem for controlling selectively the fixed optical element coupling of the narrow field of view optical subsystem or the wide field of view optical subsystem to the optically refractive relay subsystem;
   (e) the control means for controlling selectively the optical coupling of the narrow field of view optical subsystem and the wide field of view optical subsystem to the optically refractive relay subsystem comprises an electrical means for converting the fixed optical element into one of a secondary reflector for blocking the wide field of view subsystem from the optically refractive relay subsystem and optically connecting the narrow field of view subsystem to the optically refractive relay subsystem; wherein (f) the transparent reflector optical element changes from being a transparent to a reflector element with temperature and the electrical means includes an electrical heater mounted in close proximity to the transparent reflector optical element and a circuit means for selectively providing power to the heater means whereby temperature is selectively changeable with the selectively providing of power to the heater means and thus the optical coupling of the narrow field of view optical subsystem and the wide field of view optical subsystem to the optically refractive relay subsystem is controllable.

2. The dual field of view optical system according to claim 1 wherein the static optic element comprises:
a vanadium dioxide element.

3. The dual field of view optical system according to claim 1 wherein the wide field of view optical subsystem is a lens doublet.

4. A dual field of view optical system including a narrow field of view optical subsystem, a wide field of view optical subsystem, a fixed optical element and a relay subsystem common to said narrow field of view and wide field of view optical subsystems, comprising:

(a) said narrow field of view optical subsystem including a reflective objective system for forming a first focal plane, the reflective objective system including a primary reflector for reflecting radiant energy incoming thereto and said fixed optical element responsive to a source of electrical power for providing light reflection for receiving reflected radiant energy from said primary reflector and reflecting said received radiant energy towards said relay subsystem to form a first focal plane, said fixed optical element mounted in the optical path between said wide field of view subsystem and said optically refractive relay subsystem;

(b) said wide field of view optical subsystem including a refractive objective lens system and said fixed optical element responsive to the absence of electrical power supplied thereto to transmit therethrough radiant energy from said refractive objective lens system for forming a first focal plane;

(c) said optically refractive relay subsystem common to the narrow field of view reflective objective system optical path and wide field of view refractive objective lens system optical path for forming an exit pupil, said exit pupil being a second focal plane at an accessible location; and (d) control means for selectively providing electrical power signals to said fixed optical element coupling of the narrow field of view optical subsystem and the wide field of view optical subsystem to the optically refractive relay subsystem to control the condition of said fixed optical element.

5. A dual field of view optical system as set forth in claim 4 wherein said optically refractive relay subsystem includes an apertured means in said primary reflector providing a field stop for substantially eliminating the passage of any extraneous energy to said second focal plane.

* * * * *